Oct. 18, 1960   N. LEE   2,956,551
HYDRAULIC CONTROL VALVE APPARATUS FOR CONTROLLING THE SUPPLY
OF WORKING FLUID TO A HYDRAULIC CIRCULATING SYSTEM
Filed Sept. 4, 1958
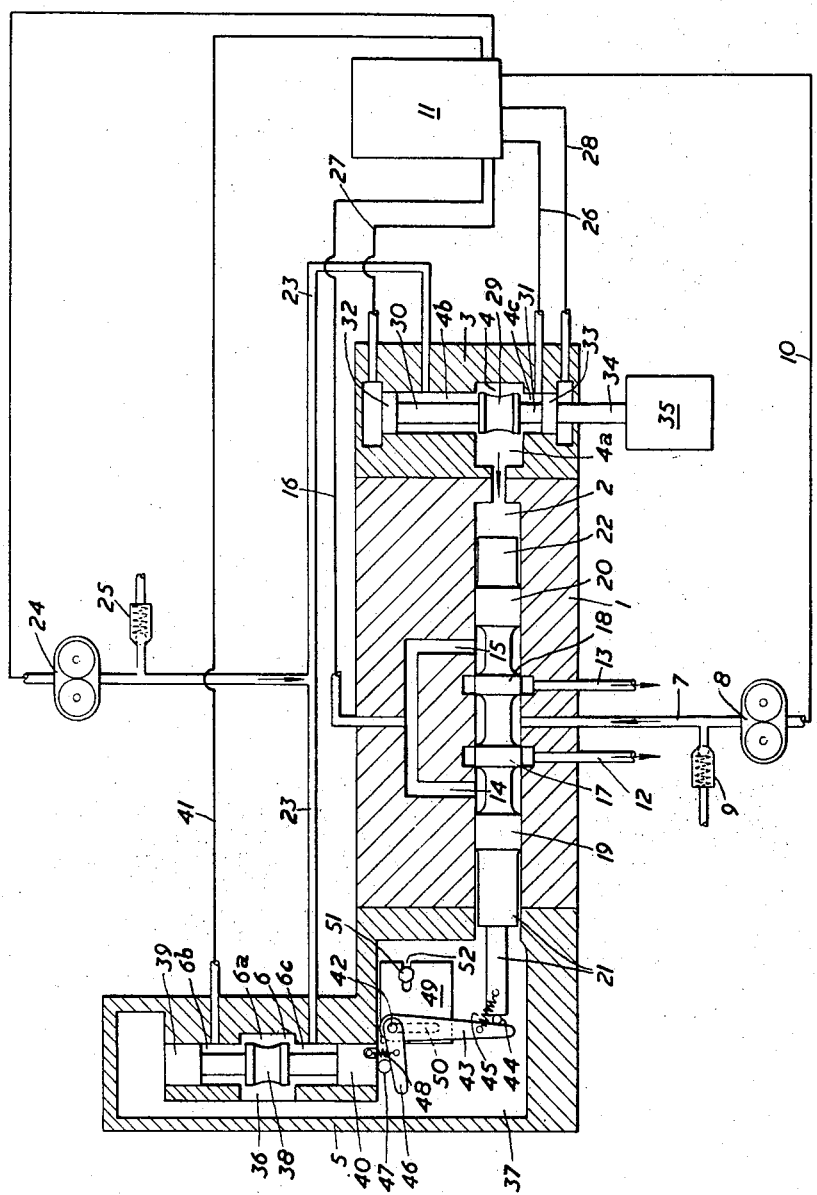
INVENTOR
NORMAN LEE
BY
Watson, Cole, Grindle & Watson
ATTORNEY United States Patent Office 2,956,551
Patented Oct. 18, 1960

2,956,551

HYDRAULIC CONTROL VALVE APPARATUS FOR CONTROLLING THE SUPPLY OF WORKING FLUID TO A HYDRAULIC CIRCULATING SYSTEM

Norman Lee, Coventry, England, assignor to The Keelavite Company Limited, Coventry, England, a company of Great Britain Filed Sept. 4, 1958, Ser. No. 759,016

Claims priority, application Great Britain Sept. 5, 1957

6 Claims. (Cl. 121—157)

This invention relates to hydraulic control valve apparatus for controlling the supply of working fluid in a hydraulic circulating system, and has for an object the provision of control valve apparatus of which the sensitivity can be predetermined and/or varied and a high degree of sensitivity achieved when required.

The present applicant's United States Appln. No. 392,388, now U.S. Patent 2,841,168, granted July 1, 1958, relates to hydraulic control valve apparatus which, in one form, embodies a main valve member of the piston type operating within a cylindrical valve chamber in a valve housing having inlet and outlet ports communication between which is controlled by the main valve member, control fluid inlet passages leading from a source of hydraulic fluid pressure respectively to the two ends of the valve chamber, a subsidiary control valve apparatus controlling the control fluid inlet passages and arranged by its movement to vary progressively the relative effective cross-sections of these inlet passages, control fluid outlet pasages leading from the ends of the valve chamber, and pressure balancing valves arranged to be moved automatically by movement of the main valve member and to control the effective cross-sectional areas of the control fluid outlet passages.

The hydraulic control valve apparatus according to the present invention may have somewhat similar characteristics to the control valve apparatus referred to above, and comprises a main valve member of the piston type operating within a cylindrical valve chamber in a valve housing having inlet and outlet ports communication between which is controlled by the main valve member, control fluid inlet and outlet passages associated with each of the two ends of the valve chamber, the control fluid inlet pasages being connected to a source or sources of fluid pressure, a control valve operated independently of the main valve member and arranged to control the control fluid inlet and outlet passages associated with one end of the valve chamber so as to vary their relative effective cross-sectional areas progressively, and a pressure balancing valve controlling the control fluid inlet and outlet passages associated with the other end of the valve chamber so as to vary their relative effective cross-sectional areas progressively and arranged to be mechanically operated by movement of the main valve member in such manner that movement of the main valve member caused by a change in pressure in one sense on one end thereof due to movement of the control valve will result in a movement of the pressure balancing valve such as to change the pressure on the other end of the main valve member in the same sense.

In hydraulic control valve apparatus according to the invention the piston faces at the two ends of the main valve member may be of the same or of different areas so that, in the latter case, the pressures acting on the two ends of the main valve member under stable conditions will not be equal but in a predetermined proportion to one another.

In any event the pressure balancing valve may be operated from the main valve member through non-adjustable mechanism or through mechanism which includes an adjustment by which the relationship between the movement of the main valve member and that of the pressure balancing valve can be varied so that the relationship between any given movement of the control valve and the corresponding movement of the main valve thus caused can similarly be varied. Alternatively or in addition an adjustment may be provided for varying the relative positions of the main valve member and the pressure balancing valve.

One construction according to the invention is illustrated somewhat diagrammatically by way of example in the accompanying drawing.

In the construction illustrated the valve apparatus comprises a housing consisting of a main part 1 in which is formed a cylindrical main valve chamber 2, an end portion 3 in which is formed a control valve chamber 4, and an end portion 5 in which is formed a pressure balancing valve chamber 6. The main valve chamber 2 is provided with a fluid inlet passage 7 arranged to be supplied continuously with fluid at a substantially constant pressure by a pump 8, the surplus supply from which escapes through a relief valve indicated at 9, the pump 8 drawing fluid through an inlet passage 10 from a reservoir 11. In addition there are formed in the main valve chamber 2 annular recesses communicating respectively with passages 12 and 13 which may lead to the inlet and outlet passages of a hydraulic motor to be controlled by the main valve, and also relief ports 14 and 15 leading through a passage 16 to the reservoir 11.

Arranged within the main valve chamber 2 is a main valve having main control lands 17 and 18 which in the neutral position of the valve close the passages 12 and 13, and end lands 19 and 20 constituing in effect pistons. Projecting from the land 19 is a two-diameter extension indicated at 21, while projecting from the land 20 is a projection 22 intended to limit the extent of the movement of the main valve to the right in the drawing.

The main valve is intended to operate in well-known manner so that if, for example, it moves to the left from its neutral position it brings the inlet passage 7 into communication with the passage 12 and brings the relief port 15 into communication with the passage 13, whereas if it moves to the right from its neutral position it brings the inlet passage 7 into communication with the passage 13 and brings the passage 12 into communication with the relief port 14.

The control valve chamber 4 has a central part 4a which communicates with the right-hand end of the main valve chamber 2 as shown and also communicates through a cylindrical part 4b of the chamber 4 with a control fluid supply passage 23 supplied with control fluid under constant pressure by a pump 24 the surplus fluid from which escapes through a relief valve 25, the inlet of the pump 24 being connected to the reservoir 11. In addition the part 4 communicates through a second cylindrical part 4c with a relief passage 26 leading to the reservoir 11. The extreme ends of the parts 4b, 4c of the control valve chamber 4 communicate through relief passages 27, 28 respectively with the reservoir 11.

The control valve comprises a main control portion 29 lying in the part 4a of the chamber and having end portions of a diameter equal to or slightly greater than that of the parts 4b and 4c, this main portion 29 being connected by reduced-diameter portions 30, 31 respectively to end lands 32, 33 serving respectively to seal off the extreme ends of the parts 4b and 4c of the control valve chamber 4.

The control valve is moreover connected by a part 34 to control apparatus indicated generally at 35 by which it is moved to effect control. The control apparatus 35 may comprise any suitable controllable source of power, as for instance a solenoid motor as in the Hayner patent, No. 2,771,062, for operatively positioning the control valve 4.

The pressure balancing valve chamber 6 comprises a central part 6a of relatively large diameter and end parts 6b, 6c of smaller diameter, the part 6a communicating through a port 36 with a chamber 37 to which the left-hand end of the main valve is exposed and into which the extension 21 projects. The pressure balancing valve comprises a main control portion 38 which lies within the part 6a of the chamber and has at its ends a diameter equal to or slightly greater than that of the parts 6b and 6c, the part 38 being connected by reduced-diameter portions to end lands 39, 40 which serve to seal off the ends of the chamber 6. The part 6c of the chamber 6 communicates with the control fluid supply passage 23 fed by the pump 24, while the part 6b communicates through a relief passage 41 with the reservoir 11.

An interconnection is provided between the part 21 of the main valve and the lower end land 40 of the pressure balancing valve comprising a two-armed lever pivoted at 42 one arm 43 of which is arranged to move with the part 21 of the main valve by means of a roller 44 with which the arm 43 and the part 21 are maintained in contact by a tension spring 45. The other arm 46 of the lever is similarly arranged to move with the pressure control valve by means of a roller 47 interposed between it and the land 40 and a tension spring 48 which maintains the arm 46 and the land 40 in permanent contact with the roller.

The pivot 42 of the lever 43, 46 is adjustably secured to a supporting block indicated at 49, as by being adjustably secured to a vertical slot indicated at 50 in that block, while the block itself is adjustably secured to the end portion 5 of the housing as by a bolt indicated at 51 passing through a horizontal slot 52 therein. Thus the pivot 42 can be adjusted both vertically and horizontally.

The operation of the valve assembly is as follows.

Assuming the parts to be in the position shown in the drawing, it will be seen that fluid under pressure from the supply passage 23 flows to the chamber parts 4b and 6c and through the annular spaces between the valve parts 29 and 38 and the parts 4a and 6a of the chambers 4 and 6 respectively into the chamber part 4a and chamber 37 while an equal amount of fluid flows out of the chamber part 4a and chamber 37 through the chamber parts 4c and 6b to the relief passages 26 and 41 back to the reservoir, with the result that the pressures in the chamber part 4a and chamber 37 are the same and the main valve comprising elements 17 to 22 thus remains in the position shown. If now the control valve (comprising elements 30 to 33) is moved by the mechanism indicated at 35 upwards, the admission of fluid under pressure from the chamber part 4b to the chamber part 4a will be reduced while the freedom of flow out of chamber 4 to the passage 26 will be increased with the result that the pressure in the chamber part 4a will drop. The main valve 17–22 therefore moves to the right and in so moving acts through the lever 43, 46 on the pressure balancing valve to move it downwards so that the flow of fluid from the passage 23 into the chamber 6a is reduced and the freedom for fluid to flow from the chamber 6a to the relief passage 41 is increased. This movement of the main valve 17–22, therefore, acts through the pressure balancing valve to bring the pressure in the chamber 37 into equality with that in the chamber part 4a after a predetermined movement of the main valve and when that equilibrium is achieved the movement of the main valve stops.

Similarly downward movement of the pressure control valve 30—33 from the position shown causes the reverse operation and therefore movement of the main valve to the left until the pressure balancing valve has thus been moved to bring the pressure in the chamber 37 up to the new pressure in the chamber part 4a.

It will be apparent that by altering the position of the pivot of the lever 42 by vertical and/or horizontal adjustment in the manner indicated above, it is possible to vary the relationship between the movement of the pressure control valve and the consequent movement of the main valve and/or the position which the main valve occupies for any given position of the pressure control valve. Further in a modified arrangement according to the invention the effective piston areas respectively at the two ends of the main valve member may be different with a view to modifying the relationship between movement of the pressure control valve and the consequent movement of the main valve. Again, for the same purpose the forms respectively of the pressure control valve and of the pressure balancing valve may differ so that the laws relating their movement and the resulting changes in pressure effected by such movement differ.

It will be understood that the various passages by which fluid pressure is delivered to the valves may be connected to a single source of fluid pressure or to two sources as shown or each to a separate source.

What I claim as my invention and desire to secure by Letters Patent is:

1. Hydraulic control valve apparatus for controlling the supply of working fluid to a hydraulic circulating system, comprising a main valve member of the piston type, a valve housing having therein a cylindrical main valve chamber in which the main valve member lies, the main valve chamber having inlet and outlet ports for communication respectively with the supply of working fluid and with the hydraulic circulating system, communication between the inlet and outlet ports being controlled by the main valve member, the main valve chamber having at each end a control fluid inlet passage and a control fluid outlet passage, both communicating with the main valve chamber at that end, a source of fluid supply for the control fluid inlet passages, a control valve operated independently of the main valve member and controlling at least one of said two control fluid inlet and outlet passages communicating with one end of the said valve chamber so as to vary the relative effective cross-sectional areas of said two control fluid inlet and outlet passages, a pressure balancing valve controlling at least one of the other fluid inlet and outlet passages communicating with the other end of the valve chamber so as to vary the relative cross-sectional areas of said other control fluid inlet and outlet passages, and a mechanical connection between the main valve member and the pressure balancing valve.

2. Hydraulic control valve apparatus as claimed in claim 1 including adjusting means varying the relationship between the movement of the main valve member and the movement of the pressure balancing valve.

3. Hydraulic control valve apparatus as claimed in claim 2 in which said adjusting means can vary the distance moved by the pressure balancing valve for a given distance moved by the main valve member.

4. Hydraulic control valve apparatus as claimed in claim 3 in which said adjusting means can also vary the position of the pressure balancing valve for a given position of the main valve member.

5. Hydraulic control valve apparatus as claimed in claim 2 in which said adjusting means can vary the position of the pressure balancing valve for a given position of the main valve member.

6. Hydraulic control valve apparatus as claimed in claim 1 in which the effective areas of the piston faces at the two ends of the main valve member are different.

References Cited in the file of this patent

UNITED STATES PATENTS

| | | |
|---|---|---|
| 2,753,146 | Wiegers | July 3, 1956 |
| 2,771,062 | Hayner | Nov. 20, 1956 |
| 2,835,265 | Brandstadter | May 20, 1958 |

FOREIGN PATENTS

| | | |
|---|---|---|
| 736,003 | Great Britain | Aug. 31, 1955 |